United States Patent
Beesley

(10) Patent No.: US 9,441,424 B2
(45) Date of Patent: Sep. 13, 2016

(54) BEND STIFFENER ASSEMBLY

(75) Inventor: Richard Austin Beesley, Ormskirk (GB)

(73) Assignees: TRELLEBORG CRP LIMITED, Stanley, Skelmersdale, Lancashire (GB); FIRST SUBSEA LIMITED, Lancaster (GB)

( * ) Notice: Subject to any disclaimer, the term of this patent is extended or adjusted under 35 U.S.C. 154(b) by 0 days.

(21) Appl. No.: 11/393,554

(22) Filed: Mar. 30, 2006

(65) Prior Publication Data

US 2008/0007056 A1    Jan. 10, 2008

(30) Foreign Application Priority Data

Mar. 30, 2005   (GB) .................................. 0506406.8

(51) Int. Cl.
*E21B 17/00* (2006.01)
*E21B 17/01* (2006.01)
*E21B 43/01* (2006.01)
*F16L 37/23* (2006.01)

(52) U.S. Cl.
CPC ......... *E21B 17/017* (2013.01); *E21B 43/0107* (2013.01); *F16L 37/23* (2013.01)

(58) Field of Classification Search
CPC .................................................. E21B 17/017
USPC .......... 403/322.2, DIG. 6; 285/322; 166/352, 166/341, 342, 367; 405/169
See application file for complete search history.

(56) References Cited

U.S. PATENT DOCUMENTS

| | | | |
|---|---|---|---|
| 3,302,709 A * | 2/1967 | Postlewaite | 166/342 |
| 3,695,633 A * | 10/1972 | Hanes | 285/18 |
| 3,847,413 A * | 11/1974 | Gurley et al. | 285/316 |
| 3,863,961 A * | 2/1975 | Dinning | 403/322.2 |
| 4,086,776 A * | 5/1978 | Beard | 166/341 |
| 4,120,232 A * | 10/1978 | Hoffman, Jr. | 403/316 |
| 4,643,472 A * | 2/1987 | Schukei et al. | 403/322.2 |
| 4,808,034 A * | 2/1989 | Birch | 405/195.1 |
| 5,125,148 A * | 6/1992 | Krasnov | 29/426.6 |
| 5,366,313 A * | 11/1994 | LaBarre | 403/322.2 |
| 5,437,518 A * | 8/1995 | Maloberti et al. | 405/169 |

(Continued)

FOREIGN PATENT DOCUMENTS

BR    200913772 A2 *    7/2012
EP    0156 575 A1    10/1985

(Continued)

OTHER PUBLICATIONS

Det Norske Veritas, Technical Report: BSW limited design & engineering: testing of ballgrab anchor connector, report No. 2002-3263, Date: Jul. 31, 2002, publisher; Det Norske Veritas, Http://www.baligrab.co.uk/downloads/dnvfatiguereport.pdf.*

(Continued)

*Primary Examiner* — Victor MacArthur
(74) *Attorney, Agent, or Firm* — Brooks Kushman P.C.

(57) ABSTRACT

A connector (10) for securing an elongate member such as an umbilical (12) a female receiving member such as an I-tube (14), has an elongate bend stiffening portion (25) and a securing portion (26) connected to the bend stiffening portion and continuous passage (36) extends through the bend stiffening portion and the securing portion. The securing portion has one or more securing members (e.g. steel balls (40)) displaceable radially outwardly into engagement with the inner face of the tube, thereby securing the connector to the I-tube.

3 Claims, 4 Drawing Sheets

(56) References Cited

U.S. PATENT DOCUMENTS

| | | | |
|---|---|---|---|
| 5,517,937 A * | 5/1996 | Lunde | 114/230.12 |
| 5,797,559 A * | 8/1998 | Coffey | 242/527.6 |
| 5,947,642 A * | 9/1999 | Teixeira et al. | 405/195.1 |
| 5,967,477 A * | 10/1999 | Walmsley | 248/230.2 |
| 6,042,303 A * | 3/2000 | Head | 405/195.1 |
| 6,202,955 B1 * | 3/2001 | Self | 242/530.3 |
| 6,220,303 B1 * | 4/2001 | Secher et al. | 138/110 |
| 6,305,649 B1 * | 10/2001 | Walmsley et al. | 248/49 |
| 6,352,115 B1 | 3/2002 | Mathieu | |
| 6,402,084 B1 * | 6/2002 | Michel | 242/571.1 |
| 6,513,751 B2 * | 2/2003 | Michel | 242/571.1 |
| 6,536,527 B2 * | 3/2003 | Munk et al. | 166/367 |
| 7,387,469 B2 * | 6/2008 | Duggan | 405/211 |
| 7,575,254 B2 * | 8/2009 | Cunha Xavier et al. | 285/45 |
| 8,451,441 B2 * | 5/2013 | Nicolas et al. | 356/243.1 |
| 2006/0038165 A1 * | 2/2006 | Larsen | 256/32 |
| 2008/0007056 A1 * | 1/2008 | Beesley | 285/321 |
| 2010/0133811 A1 * | 6/2010 | Taylor | 285/313 |
| 2011/0061582 A1 * | 3/2011 | Braud et al. | 114/293 |
| 2011/0092115 A1 * | 4/2011 | Braud et al. | 441/3 |
| 2011/0199608 A1 * | 8/2011 | Nicolas et al. | 356/243.1 |
| 2012/0012044 A1 * | 1/2012 | Lavagna et al. | 114/230.12 |
| 2012/0168172 A1 * | 7/2012 | Litherland et al. | 166/367 |

FOREIGN PATENT DOCUMENTS

| WO | WO 2004055319 A1 * | 7/2004 |
|---|---|---|
| WO | WO 2004055394 A1 * | 7/2004 |

OTHER PUBLICATIONS

Search Report under Section 17 for Application No. GB0506406.8, dated Jul. 12, 2005, one page.

* cited by examiner

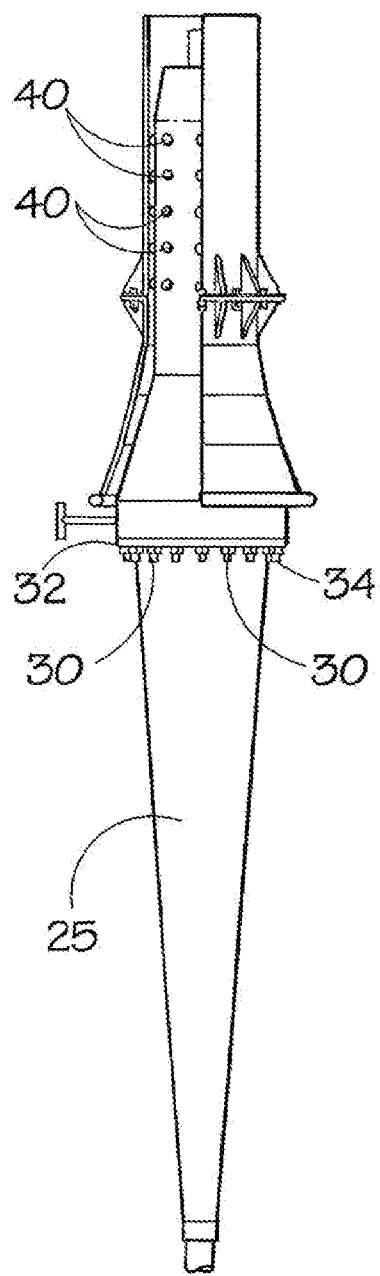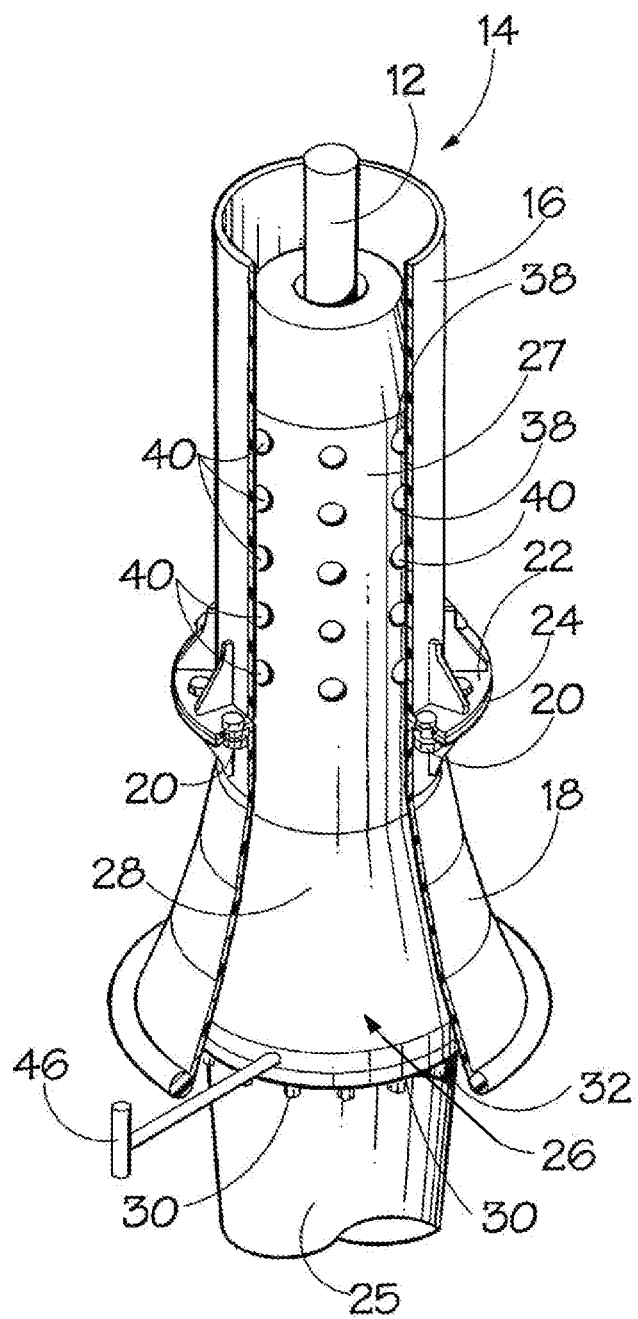
FIG. 2
FIG. 3

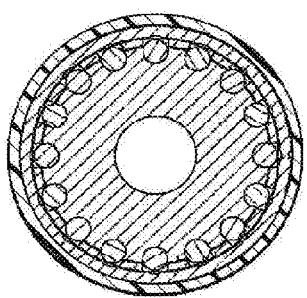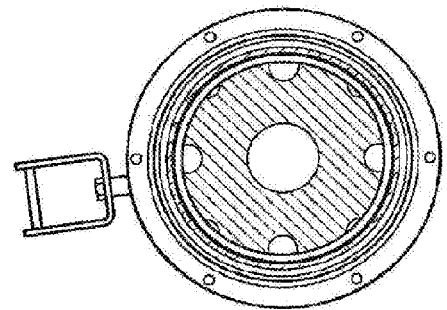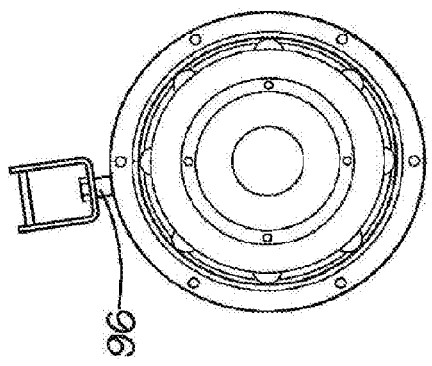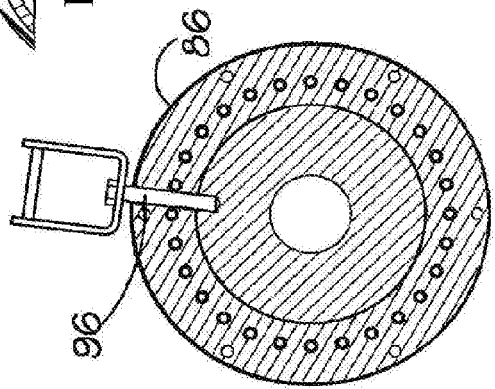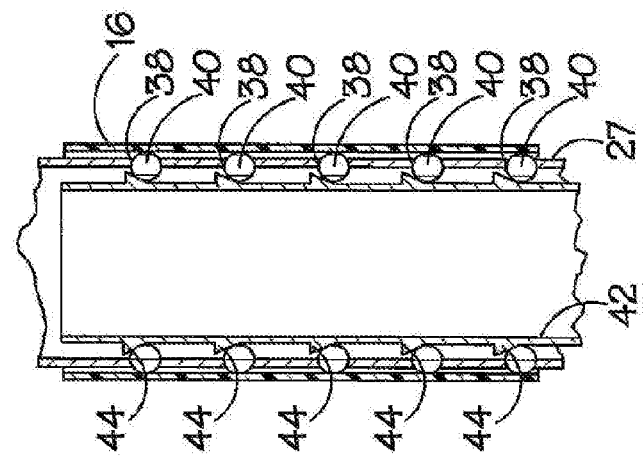

BEND STIFFENER ASSEMBLY

BACKGROUND OF THE INVENTION

1. Field of the Invention

The present invention relates to connectors and in particular, but not exclusively, to connectors for use with underwater elongate members such as umbilicals, pipes, risers and the like.

2. Background Art

In sub-sea applications, particularly in the oil and gas production industry, it is frequently necessary to secure an elongate member such as a pipe or umbilical to a production platform, surface vessel or the like. This is conventionally done by attaching a pulling head to the elongate member and by drawing the pulling head and elongate member attached to it through a so-called "I-tube", which is a downwardly projecting tube secured to the production platform, service vessel or the like. Once the pulling head has been pulled through the I-tube, it can be secured in position, thereby securing the elongate member to the production platform, support vessel or the like.

However, the bending moments and lateral forces to which the I-tube and the elongate member can be subjected are limited and it is therefore desirable to limit the lateral deflection of the elongate member. This can be achieved to a limited extent by providing the I-tube with a so-called "bell-mouth" at its lower end, but this is not always sufficient.

In order to provide an increased bend stiffening ability, it is known to secure a conventional frusto-conical bend stiffener to the lower end of the I-tube, which provides the desired bend stiffening performance. However, in order to secure the bend stiffener to the I-tube, it is necessary to pass securing bolts projecting from the end of the bend stiffener through apertures in a securing flange at the lower end of the I-tube and to secure the two together by means of securing nuts.

However, the securing operation would normally take place in a hostile underwater environment and would require the services of a diver which is both expensive and dangerous and less feasible at greater depths due to health and safety issues.

SUMMARY OF THE INVENTION

There is therefore a need for a connector having an enhanced bend stiffener capability but which can be connected easily and quickly to an I-tube, preferably without the need for the intervention of a diver.

In accordance with the present invention, a connector for securing an elongate member to a female receiving member comprises an elongate bend stiffening portion and a securing portion connected to the bend stiffening portion, a continuous passage extending through the bend stiffening portion and the securing portion, the securing portion comprising a body portion and one or more securing members displaceable radially outwardly of the body portion.

The bend stiffening portion provides the enhanced bend stiffening capability. On the other hand, the securing portion can easily and quickly be secured to an I-tube by displacing the securing members radially outwardly into self-engaging mechanical engagement with the inner face of an I-tube.

Preferably, a plurality of securing members is provided. Conveniently, the or each securing member comprises a ball member.

Preferably, each ball member is displaceable so that it projects through an associated aperture in the wall of the body portion. Preferably, the balls are prevented from passing through the apertures.

Preferably, the connector further comprises clamp means adapted to be attached to the elongate member to be secured.

Preferably, the clamp means comprises a clamp adapted to be secured to the elongate member at a position spaced from the lowermost portion of the bend stiffening portion.

Preferably, the clamp means comprises a clamp adapted to be secured to the elongate member at a position immediately below, and in abutment with, the lowermost portion of the bend stiffening portion during installation of the connector.

Preferably, the connector comprises an actuating member which is movable to displace the securing members radially outwardly.

Preferably, the actuating member comprises a plurality of inclined portions, each of which engages with a respective one of the securing members, whereby movement of the actuating member in a first direction urges the securing members radially outwardly.

In one embodiment, the connector comprises spring means for urging the actuating member in one direction. The spring means preferably urge the actuating member in the first direction.

The connector may comprise further securing members displaceable radially outwardly by movement of the actuating member.

Preferably, the securing members are urged radially outwardly by movement of the actuating member in a direction opposite to that which results in outward displacement of the first securing member.

BRIEF DESCRIPTION OF THE DRAWINGS

By way of example only, a specific embodiment of the present invention will now be described with reference to the accompanying drawings, in which:

FIG. 2 is a detailed side view of the umbilical connector of FIG. 1;

FIG. 3 is a detailed perspective view of the umbilical connector of FIG. 1;

FIG. 4 is a cross-section through an actuation mechanism of the connector of Fig. 3;

FIG. 7 is an end view of the connector of FIG. 5, looking in the direction of arrow VII;

FIG. 8 is a transverse cross-section through the connector of FIG. 5, looking in the direction of arrows VIII-VIII;

FIG. 9 is partial cross-section of the connector of FIG. 5, looking in the direction of arrows IX-IX;

FIG. 10 is a transverse cross-section of the connector of FIG. 5, looking in the direction of arrows X-X; and FIG. 11 is a transverse cross-section of the connector of FIG. 5, looking in the direction of arrows XI-XI.

DETAILED DESCRIPTION OF THE PREFERRED EMBODIMENTS

Figures 1, 1A, 1B:
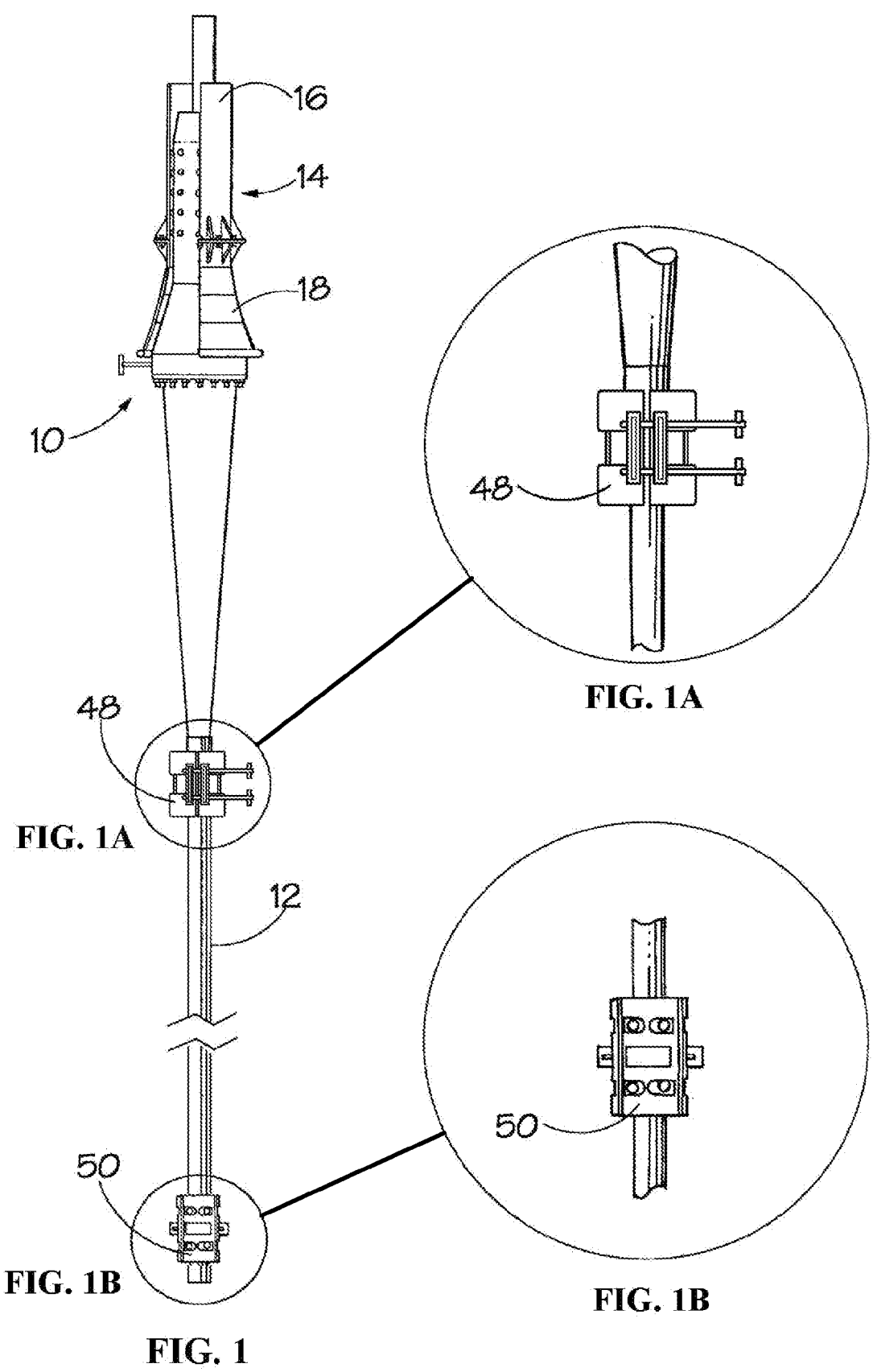
FIG. 1 is a side view of an embodiment of underwater umbilical connector in accordance with the present invention, showing an I-tube to which the connector is secured partly cut-away.

Referring firstly to FIGS. 1 to 3, a connector 10 is adapted to secure an underwater "umbilical" 12 to an elongate tubular "I-tube" 14 which is securely fastened to, and projects downwardly from, a production platform, service vessel, or the like. The I-tube 14 is conventional and comprises a main tubular section 16 and a flared bell-mouth section 18 secured to the lower end of the tubular section 16 by means of bolts 20, passing through aligned apertures in peripheral abutting flanges 22, 24 on the two sections.

The connector 10 comprises a frusto-conical bend stiffener portion 25 made from polyurethane, secured to an elongate connection portion 26 comprising a generally cylindrical upper body portion 27 of slightly smaller outer diameter than the inner diameter of the I-tube 14 and a frusto-conical lower bend stiffener interface 28. A plurality of bolts 30 are secured to the bend stiffener interface 28 of the connector body and threaded shanks of the bolts project from the bend stiffener interface 28 parallel to the longitudinal axis of the connector 10. The projecting portions of the bolts are received in corresponding holes in a metal peripheral securing flange 32 connected to the upper end of the bend stiffener portion 25 and each receives a retaining nut 34 which is tightened in order to secure the bend stiffener portion 25 to the connection portion 26. The connector 10 is provided with an elongate through aperture 36 for passage of the umbilical 12.

Referring to FIGS. 3 and 4 in particular, the cylindrical upper body portion 27 of the connection portion 26 is tubular and is provided with eight parallel rows of five circular apertures 38 passing through the wall of the upper body portion 27, the rows extending parallel to the longitudinal axis of the connector and being equally spaced around the circumference of the upper portion 27. Each aperture 38 is provided with a super duplex stainless steel ball 40 whose diameter allows it to project partially out of the aperture but which prevents the ball from passing through completely.

The projection of the balls 40 through the apertures 38 is controlled by an engagement mechanism comprising an actuating sleeve 42 located within the connection portion 26. The sleeve 42 is provided with five inclined ramp surfaces 44 extending around the periphery of the sleeve, each ramp surface 44 engaging with each of the eight stainless steel balls 40 at a particular level of the upper body portion 27. By displacing the sleeve downwardly (i.e. towards the bend stiffener portion 25), the ramp surfaces 44 engage with the balls 40 and displace the balls radially outwardly so that they project partially out of the apertures 38 beyond the cylindrical surface of the body portion 27. Displacing the sleeve 42 in the opposite direction withdraws the ramp surfaces 44 from the balls 40 and allows the balls to be displaced inwardly.

The actuating sleeve 42 is itself displaced by means of a handle 46 projecting radially outwardly from the lowermost end of the connection portion 26 which moves a mechanical linkage (not shown) to which the sleeve 42 is connected.

In use, in order to secure the umbilical 12, one end of the umbilical is passed through the connector 10. As shown in FIG. 1, a conventional removable clamp means for clamping 48 is secured to the umbilical 12, immediately below the lowermost end of the bend stiffener portion 25 of the connector 10, to prevent the connector 10 from sliding down the umbilical 12 during installation. A further removable clamp is also located further down the umbilical 12 (preferably permanently, but possibly removably), to limit the extend to which the connector 10 can travel along the umbilical in the event that the connector becomes detached.

The umbilical 12 is then fed through the I-tube 14 and is pulled through the I-tube in the conventional manner. In due course, the connector 10 will be drawn into the I-tube, with the upper body portion 27 of the connector within the main tubular section 16 of the I-tube 14. At this point, the handle 46 is operated (usually by means of a conventional remote observation vehicle) which causes the actuating sleeve 42 to be displaced downwardly, thereby engaging the ramp surfaces 44 with the steel balls 40. The balls 40 are thereby displaced radially outwardly through the apertures 38 into engagement with the inner face of the main tubular section 16 of the I-tube 14, thereby securing the connector to the I-tube 14. It will be observed from FIG. 4 that any downward force on the connector will tend to urge the stainless steel balls 40 up the ramp surfaces 44, thereby increasing the force with which the balls 40 engage with the tube 14.

When the balls 40 are tightly engaged with the I-tube, the uppermost clamp 48 on the umbilical, i.e. the clamp immediately below the lowermost end of the bend stiffener portion 25, is removed, preferably by means of a remote observation vehicle.

Once the balls 40 are engaged in the upper body portion 27, the upper clamp 48 is removed by means of a remote observation vehicle and the umbilical 12 can be pulled further up the I-Tube 14 so that a connection can be made at the top of the I-Tube. The lower clamp 50 on the umbilical is positioned to allow this movement and to end up a few metres below the tip of the bending stiffener portion 25 when the connection has been made with the umbilical at the top of the I-tube 14. The lower clamp 50 remains in place throughout the design life as a safety clamp which in the case of disconnection will prevent the connector assembly from slipping down the umbilical. The assembly is then ready for use.

The second embodiment of the invention, illustrated in FIGS. 5 to 11, is a modification of the first embodiment. The bend stiffener portion 25 of the second embodiment is identical to that of the first embodiment and has therefore been omitted from FIGS. 5 to 11. The difference between the first and second embodiments lies in the connection portion, which is illustrated in FIGS. 5 to 11.

The connection portion 60 of the second embodiment comprises a tubular, cylindrical upper housing 62 having an annular end cap 64 secured to its upper end. The end of the housing towards the end cap 64 is provided with eight parallel rows of two circular apertures 66 passing through the wall of the housing, the rows extending parallel to the longitudinal axis of the connector, being equally spaced around the circumference of the housing and with the apertures in each row being longitudinally spaced with respect to the apertures in the adjacent rows. Each aperture 66 is 25 provided with a super duplex stainless steel ball 68 whose diameter allows it to project partially out of the aperture 66 but which prevents the ball from passing through completely.

Figure 6:
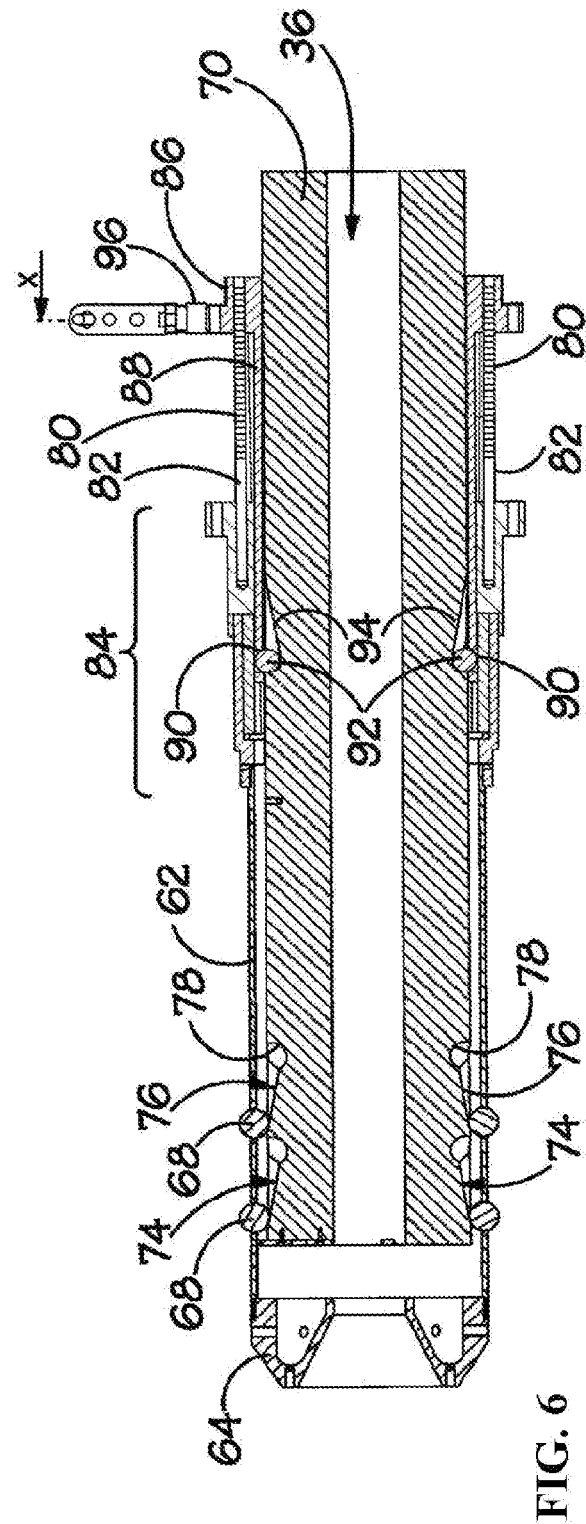
FIG. 6 is a longitudinal cross-section through the connector of FIG. 5.

The projection of the balls 68 through the apertures 66 is controlled by movement of the housing 62 with respect to a mandrel 70 which is located within the housing 62. The mandrel 70 is tubular and is provided with a central elongate passage 36 for receipt of a pipe, umbilical or other elongate member. The end of the mandrel 70 adjacent to the apertures 66 in the housing 60 is provided with sixteen pockets 74 in its outer surface, each pocket being arranged to receive a respective one of the balls 68. As best seen in FIG. 6, each pocket 74 comprises an inclined or ramped portion 76 and a part-spherical portion 78 which is complementarily-shaped and sized with the diameter of the balls 68. The balls 68 are received in the part-spherical portions 78 of the pockets 74 during assembly of the connector, to allow the housing 62 to be located over the mandrel 70 without catching on the balls.

Figure 5:
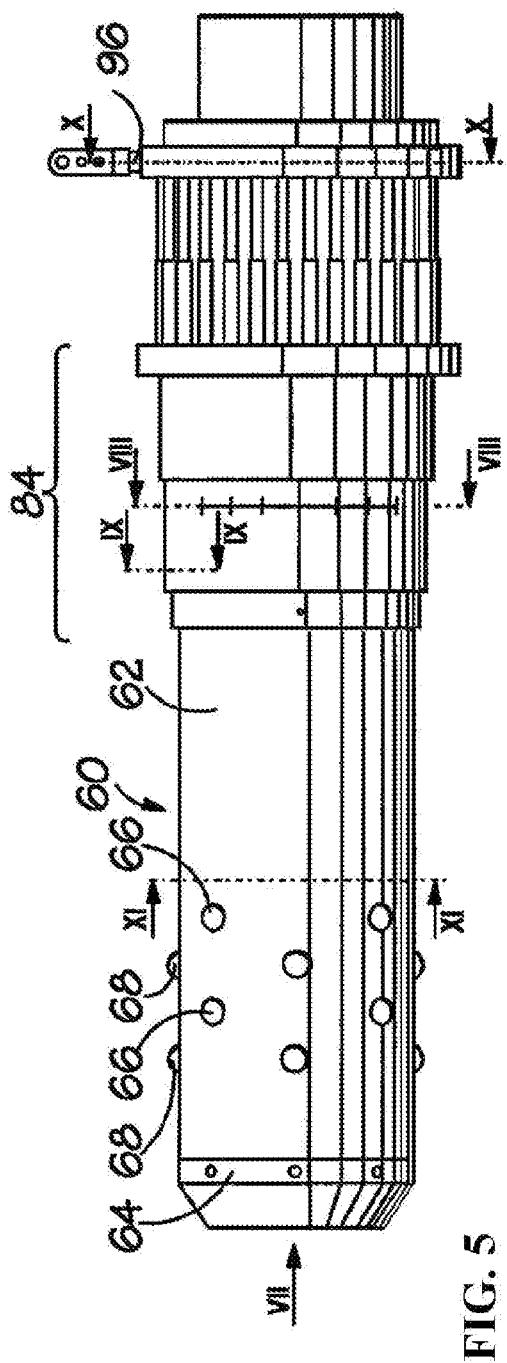
FIG. 5 is a side view of a second embodiment of an underwater umbilical connector in accordance with the present invention.

By displacing the housing 62 with respect to the mandrel 70 in an upward direction (to the left as shown in FIGS. 5 and 6), the engagement of the inclined ramped surfaces 76 with the respective balls 68 displaces the balls 68 radially outwardly so that they project partially out of the apertures 66 beyond the cylindrical surface of the housing 62 and into engagement with the inner wall of an I-tube 14. Displacing the housing 62 in the opposite direction with respect to the mandrel 70 allows the balls 68 to be displaced radially inwardly to a position in which the balls 68 are withdrawn from the inner wall of the I-tube 14.

The housing 62 is spring-biassed upwardly (towards the left as illustrated in FIGS. 5 and 6), towards the position shown in FIGS. 5 and 6 in which the balls 68 project from the apertures 66 in the cylindrical housing 62. This is achieved by means of sixteen compression springs 80, each located in a respective elongate telescopic housing 82. The springs 80 and housings 82 are equally angularly spaced around the periphery of the connector and extend parallel to the longitudinal axis. The springs 80 and housings 82 extend between an annular collar 84 fixedly secured to the cylindrical housing 62 and an annular collar 86 of a cylindrical locking sleeve 88 which is slidably disposed on the mandrel 70 but which is initially secured to the mandrel by means of a retaining peg 96 which passes through an aperture in the collar 86 and an aligned recess in the exterior of the mandrel 70, as illustrated in FIG. 10. The uppermost end of the sleeve 88 is provided with sixteen equally angularly spaced apertures 90, each of which receives a respective one of sixteen further super duplex stainless steel balls 92 whose diameter allows it to project partially out of the aperture 90 but which prevents the ball from passing through completely.

Each of the further balls 92 is received in a respective one of sixteen further pockets 94 formed in the exterior surface of the mandrel 70, the pockets 94 being inclined or ramped in the opposite direction to that of the pockets 74.

In use, the connector is supplied with the springs 80 in a compressed state, as illustrated in FIGS. 5 and 6. At this point, the collar 86 and the mandrel 70 are still secured together by the retaining peg 96. The springs react against the collar 86 (and the mandrel 70 to which it is still secured by the peg 96), pushing the collar 84 upwardly (towards the left as shown in FIGS. 5 and 6) with respect to the mandrel 70, thereby forcing the balls 68 up their respective ramps 76 and displacing them radially outwardly through the apertures. The radial outward movement is limited since the diameter of the apertures 66 is smaller than that of the balls 68.

In order to secure an umbilical, one end of the umbilical is passed through the connector, as in the first embodiment. As for the first embodiment, a conventional, removable clamp is secured to the umbilical immediately below the lowermost end of the bend stiffener portion of the connector, to prevent the connector from sliding down the umbilical during installation. A further removable clamp is also located further down the umbilical, to limit the extent to which the connector can travel along the umbilical in the event that the connector becomes detached.

The umbilical is then fed through the I-tube and is pulled through the I-tube in a conventional manner. The connector is then drawn into the I-tube, with the connecting portion 60 within the main tubular section 16 of the I-tube 14. The force from the springs 80 on the housing 62 holds the balls 68 in contact with the inside of the tube 14. Tension is then released on the umbilical, which allows the mandrel 70 to move downwards (to the right in FIGS. 5 and 6), thereby forcing the balls 68 further up the ramps 76 and engaging the balls 68 with the inside of the tube 14. The retaining peg 96 is then removed (usually by means of a remote observation vehicle). This allows the springs 80 to react against the collar 84 and to displace the collar 86 and sleeve 88 downwards (to the right in FIGS. 5 and 6), forcing the second set of balls 92 up the ramps 94 and engaging them with the sleeve 88.

Any downward force on the connector tends to urge the balls 68 up the ramped surfaces 76, thereby increasing the force with which the stainless ball engage with the tube.

Conversely, any upward force on the connector tends to urge the second set of balls 92 up the ramped surfaces 94, into engagement with the collar 84 secured to the cylindrical housing 62, thereby tending to the lock the connector in the opposite direction.

As for the first embodiment, when the balls 68 are tightly engaged with the I-tube, the uppermost clamp on the umbilical i.e. the clamp immediately below the lowermost end of the bend stiffener portion, is removed, preferably by means of a remote observation vehicle.

Again as for the first embodiment, once the balls 68 are firmly engaged, the umbilical is pulled further up the I-tube so that a connection can be made at the top of the I-tube. The lower clamp on the umbilical is positioned to allow this movement and to end up a few metres below the tip of the bending stiffener portion when the connection is being made with the umbilical at the top of the I-tube.

The invention is not restricted to the details of the foregoing embodiments. In particular, many different mechanisms for urging the super duplex balls radially outwardly could be used, instead of the ramps described and shown above. Moreover, the invention is not restricted to securing an umbilical but could instead be used for securing other elongate members such as pipes.

The invention may also utilise a bend stiffening portion of a type other than a frusto-conical type, which is described above by way of example only.

In addition, the invention is equally applicable to connecting to other types of I-tube and/or to an I-tube which does not have a flared bell-mouth section at its lower end. Also, the number and/or location of the balls 40 and associated apertures 38 may differ from the embodiment described, depending on the circumstances. Moreover, the materials used for construction of the components may differ from those mentioned above. For example, the super duplex stainless steel balls may instead be made from a different material.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:
1. A bend stiffener assembly for stiffening an underwater elongate member where the elongate member emerges from a downwardly extending tube secured to and projecting downwardly from a production platform or support vessel, the bend stiffener assembly comprising
  (a) bend stiffener portion which comprises an elongate frustoconical body;
  (b) a connection portion for mounting the bend stiffener portion to the downwardly extending tube,

(c) a continuous through-passage formed by the connection portion and the bend stiffener portion for receiving the underwater elongate member, the connection portion comprising a generally cylindrical body portion having a plurality of apertures passing through a wall of the body portion, the body portion being received in the downwardly extending tube and a bend stiffener interface through which the bend stiffener is mounted to the body portion the body portion being provided with one or more securing ball members having a diameter that allows projection partially out of the apertures which prevents the ball members from passing through the apertures; and with an actuating member located within the connection portion, the actuating member being provided with inclined ramp surfaces that engage the securing ball members for reversibly displacing the one or more securing ball members radially outwardly through the apertures to releasably engage the securing ball members with the downwardly extending tube and thus releasably securing the bend stiffener to the downwardly extending tube, so that by displacing the actuating member in a first direction with respect to the bend stiffener portion, the ramp surfaces engage with the securing ball members and displace them radially outwardly so that they project partially out of the apertures beyond the upper body portion, thereby releasably securing the bend stiffener to the downwardly extending tube; and so that displacing the actuating member in the opposite direction withdraws the ramp surfaces from the securing ball members and allows the ball members to be displaced inwardly, thereby allowing the bend stiffener to be removed from the downwardly extending tube, wherein there are two sets of ball members, each set being manipulated in opposite directions by the actuating member wherein movement in one direction moves a set of ball members radially outwardly via a first set of ramp members and also moves another set of balls radially inwardly via a second set of ramp members at the same time, and wherein actuating member movement in an opposite direction has an opposite effect on ball member displacement.

2. The bend stiffener assembly of claim 1, further comprising a spring for urging the actuating member in one direction.

3. The bend stiffener assembly of claim 2, wherein the spring urges the actuating member in the first direction.

* * * * *